Patented Aug. 19, 1941

2,253,034

UNITED STATES PATENT OFFICE 2,253,034

MANUFACTURE OF KETONES AND ALDEHYDES

Vladimir N. Ipatieff and Raymond E. Schaad, Chicago, Ill., assignors to Universal Oil Products Company, Chicago, Ill., a corporation of Delaware No Drawing. Application January 15, 1938, Serial No. 185,155

8 Claims. (Cl. 260—597)

This invention relates to the manufacture of organic compounds containing a carbonyl group by interacting acetylene or its alkyl derivatives with water in the presence of catalysts which are particularly effective in promoting this type of reaction.

The simplest reaction of this character is shown by the following equation representing the interaction of acetylene and water to produce aldehyde.

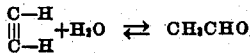

In case the hydrogen atoms in the acetylene are substituted by an alkyl group, as in the case of methyl acetylene, ketones are formed as shown by the following equation indicating the formation of acetone from methyl acetylene.

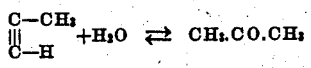

These reactions are ordinarily brought about using such catalysts as sulfuric acid or solutions of mercuric salts.

The value of aldehydes and ketones as commercial products does not need any extensive recounting since these compounds have not only value in themselves as solvents and reagents, but also form the basis for the manufacture of a large number of derivatives which have special uses in the arts and it is with improvements in a type of reaction which produces good yields of these compounds that the present invention is concerned.

In one specific embodiment the present invention comprises the manufacture of acetaldehyde and various ketones by the interaction of acetylene and its various alkyl derivatives, respectively, with steam at temperatures in the approximate range of 150–300° C. in the presence of solid phosphoric acid catalysts.

The type of catalysts which have been found specially effective in promoting the present type of reaction are produced by the general steps of mixing phosphoric acids (usually in major proportion) with relatively inert spacing materials such as, for example, kieselguhr or certain clays until a paste is obtained, calcining the pasty material at a temperature of the order of 300–400° C. to produce a solid cake, grinding the cake to produce granules of approximately 4–20 mesh and finally subjecting the granules to contact with steam at temperatures of the order of 250–260° C. and at substantially atmospheric pressure to produce an acid of the composition corresponding to maximum catalytic activity. The foregoing procedure may be varied by forming particles of the original paste by extrusion or pelleting methods and then following by the steps of calcining and rehydrating. Either ortho or pyro phosphoric acid may be used in the primary mixes, the former at ordinary temperatures and the latter, at temperatures of approximately 160–180° C. to insure proper fluidity and intimate mixing.

Catalysts of the foregoing character are apparently composed of certain proportions of silico-phosphoric acid complexes, unacted upon carrier, and a percentage of a free phosphoric acid which appears from analysis to be most closely related in composition to the pyro acid having the formula, $H_4P_2O_7$. In the present instance catalysts of this type may act by virtue of their ability to form addition products with the acetylene or acetylene derivatives and also by virtue of their ease of hydration and dehydration, assuming the intermediate compound theory of catalysis as a possible explanation.

In operating the process the catalyst is preferably placed in a vertical cylindrical treating chamber having a perforated false bottom or a screen for supporting the catalyst bed and a proportioned mixture of hydrocarbon and steam is passed downwardly through the catalyst bed at substantially atmospheric pressure and an optimum rate and temperature both of which latter conditions will vary somewhat with the activity of the catalyst and with the particular acetylene undergoing treatment. Unchanged hydrocarbons may be separated from the reaction products and steam and recirculated for further conversion reactions so that a high conversion is made possible.

In the production of acetaldehyde from acetylene and steam, approximately equivalent molecular quantities of reactants are employed, and temperatures of about 300° C. Under these conditions approximately 50% of the acetylene is reacted in a single pass and acetaldehyde is produced in an amount approximately equivalent to the theoretical yield calculated from the quantity of water which was consumed in the reaction. There is concurrently some formation of higher boiling oily material which may correspond to high molecular weight condensation products of either acetylene or acetaldehyde, and in general the formation of such products is avoided by maintaining a relatively low temperature and low rate of reaction particularly in the case of fresh and active catalysts. As the catalyst activity decreases due to the gradual building up of carbonaceous deposits on its surface, the temperature is preferably increased to compensate for its loss in activity.

Formation of ketones from the alkyl derivatives of acetylene is usually accomplished at somewhat lower temperatures than those required for the production of acetaldehyde from acetylene, these temperatures being principally comprised within the range of 150 to 300° C. In all instances unconverted hydrocarbon may be recycled to increase the ultimate yield.

The regeneration of spent catalyst is brought about by the general steps of oxidizing off carbonaceous materials by passing oxidizing gas mixtures through the catalyst bed. The best method which prevents undue rise in temperature due to the decomposition reactions and hence preserves the structure and other desirable properties of the catalysts consists in utilizing primarily combustion gases of relatively low oxygen content and gradually increasing the oxygen content by the addition of air until finally air alone is used. Usually best results in reactivation are obtained when gas mixtures containing less than 5% by volume of water vapor are employed and when temperatures of approximately 950° F. are not exceeded in the burning period. After the removal of carbonaceous deposits the catalyst is preferably further subjected to the action of superheated steam at atmospheric pressure and temperatures of from 250–260° C. to rehydrate the phosphoric acid, a part of which apparently is converted to the inactive meta acid during the burning period.

The following examples are given to indicate the results normally obtainable in the practical application of the present process although not with the intention of unduly circumscribing its proper scope.

Example I

The following tabulation of data includes the significant figures obtained in three runs wherein acetylene and steam were passed downwardly through granular solid phosphoric acid catalyst under the conditions indicated:

|  | Run number | | |
|---|---|---|---|
|  | 1 | 2 | 3 |
|  | Fresh catalyst | After reactivation | |
| Duration of run.........................hours.. | 21 | 23 | 22 |
| Temperature.................................°C.. | 300 | 300 | 300 |
| Catalyst, 3⁄16" extruded...........grams.. | 100 | 98 | 98 |
| Total charge: | | | |
|   Water, cc., evaporated to steam...... | 220 | 227 | 226 |
|   Acetylene, cu. ft. at standard conditions.................................... | 8.81 | 10.30 | 5.10 |
| Weight charged: | | | |
|   Water......................................grams.. | 220 | 227 | 226 |
|   Acetylene..................................do.... | 289 | 338 | 167 |
|   Total charge............................do.... | 509 | 565 | 393 |
| Products: | | | |
|   Exit acetylene..........................cu. ft.. | 5.48 | 6.80 | 3.94 |
|   Exit acetylene........................grams.. | 162.00 | 201.00 | 116.50 |
|   Acetaldehyde..............................do.... | 71.60 | 74.50 | 48.20 |
|   Water layer..................................do.... | 187.90 | 190.00 | 203.40 |
|   Oil layer........................................do.... | 38.48 | 21.20 | 4.40 |
| Recovery, percent by weight of charge.... | 94.50 | 89.80 | 95.0 |
| Absorption of acetylene...............percent.. | 44 | 40 | 30 |
| Acetylene consumed...................grams.. | 127 | 137 | 50.5 |
| Water consumed.............................grams.. | 33 | 37 | 22.6 |
| Theoretical yield of acetaldehyde calculated from water consumed...grams.. | 80 | 90 | 55 |
| Actual yield, percent of theoretical....... | 89.5 | 82.8 | 87.6 |

As will be seen from the above table the yield of acetaldehyde under the best conditions of operation was well over 80% of the theoretical yield calculated on the basis of the water consumed in the reaction. Experiments conducted subsequent to those recorded in the table showed that the amount of oily layer could be decreased by using a higher ratio of steam to acetylene and a catalyst of somewhat lower activity.

Example II

In this case substantially pure ethyl acetylene having a boiling point of +8° C. was passed with an amount of steam corresponding to a molal ratio of water to hydrocarbon of 2.5:1 down through a 6–10 mesh solid phosphoric acid catalyst maintained at a temperature of 200° C. The yield of methyl ethyl ketone was 58% based upon the hydrocarbon charged along with the production of approximately 10% of high boiling liquid products principally of a hydrocarbon character.

The nature of the present invention and its novel and commercial utility are obvious from the preceding descriptive and numerical sections, although neither is intended to unduly limit its scope.

We claim as our invention:

1. A process for producing acetaldehyde which comprises reacting acetylene with steam in the presence of a calcined mixture of a phosphoric acid and a siliceous material capable of forming a silico-phosphoric acid complex.

2. A process for producing acetaldehyde which comprises reacting acetylene with steam in the presence of a calcined mixture of a phosphoric acid and a siliceous material capable of forming a silico-phosphoric acid complex at a temperature in the approximate range of 150–300° C.

3. A process for producing ketones which comprises reacting an alkyl acetylene with steam in the presence of a calcined mixture of a phosphoric acid and a siliceous material capable of forming a silico-phosphoric acid complex.

4. A process for producing ketones which comprises reacting an alkyl acetylene with steam in the presence of a calcined mixture of a phosphoric acid and a siliceous material capable of forming a silico-phosphoric acid complex at a temperature in the approximate range of 150–300° C.

5. A process for producing acetone which comprises reacting methyl acetylene with steam in the presence of a calcined mixture of a phosphoric acid and a siliceous material capable of forming a silico-phosphoric acid complex.

6. A process for producing acetone which comprises reacting methyl acetylene with steam in the presence of a calcined mixture of a phosphoric acid and a siliceous material capable of forming a silico-phosphoric acid complex at a temperature in the approximate range of 150–300° C.

7. A process for the manufacture of organic compounds containing a carbonyl radical from acetylene hydrocarbons selected from the group consisting of acetylene and its alkyl derivatives, which comprises reacting the acetylene hydrocarbon with steam in the presence of a calcined mixture of a phosphoric acid and a siliceous material capable of forming a silico-phosphoric acid complex.

8. A process for the manufacture of organic compounds containing a carbonyl radical from acetylene hydrocarbons selected from the group consisting of acetylene and its alkyl derivatives, which comprises contacting the acetylene hydrocarbon, in admixture with steam, with a calcined mixture of a phosphoric acid and a siliceous material capable of forming a silico-phosphoric acid complex in the approximate range of 150–300° C.

VLADIMIR N. IPATIEFF.
RAYMOND E. SCHAAD.